United States Patent Office 3,655,856
Patented Apr. 11, 1972

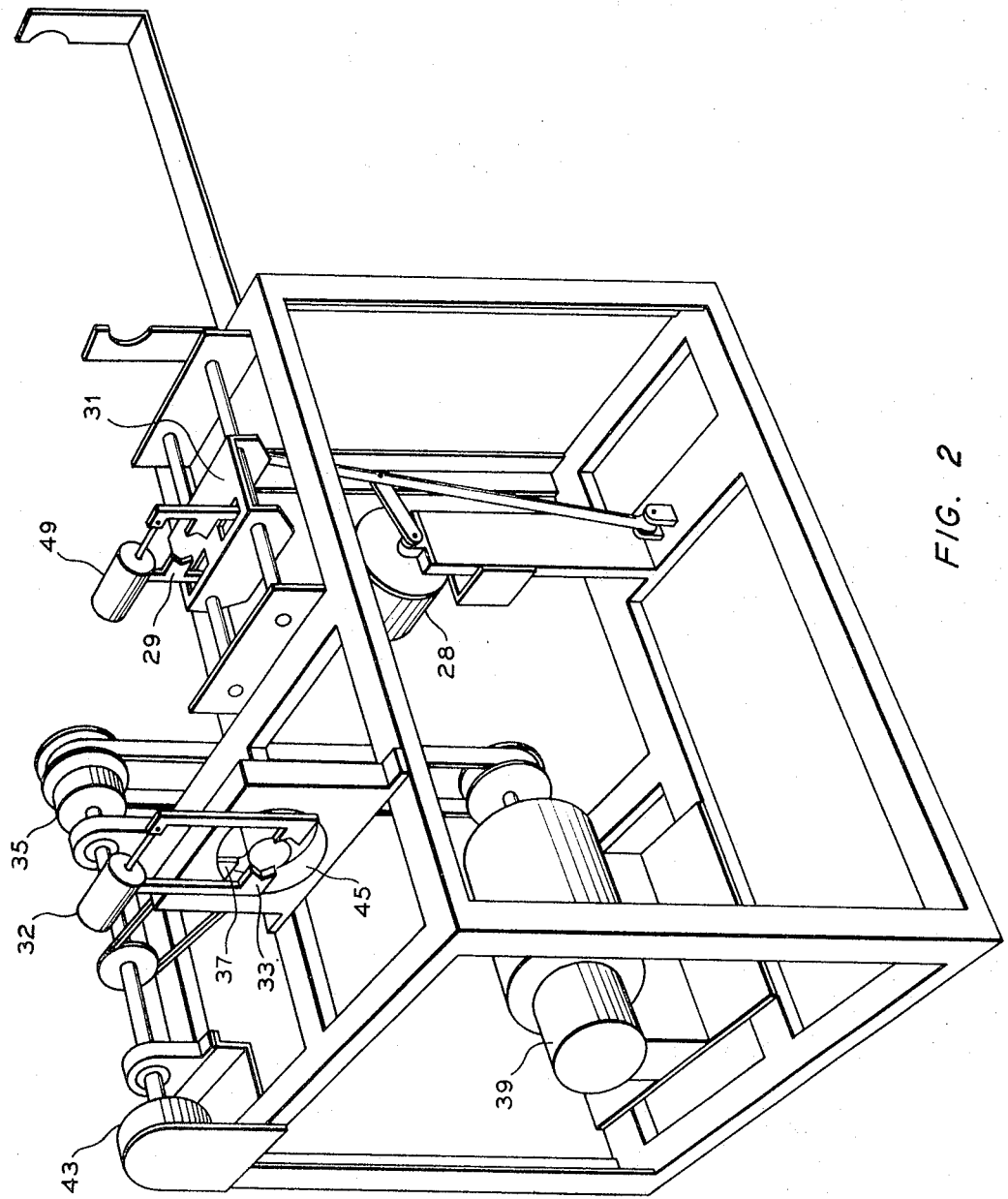

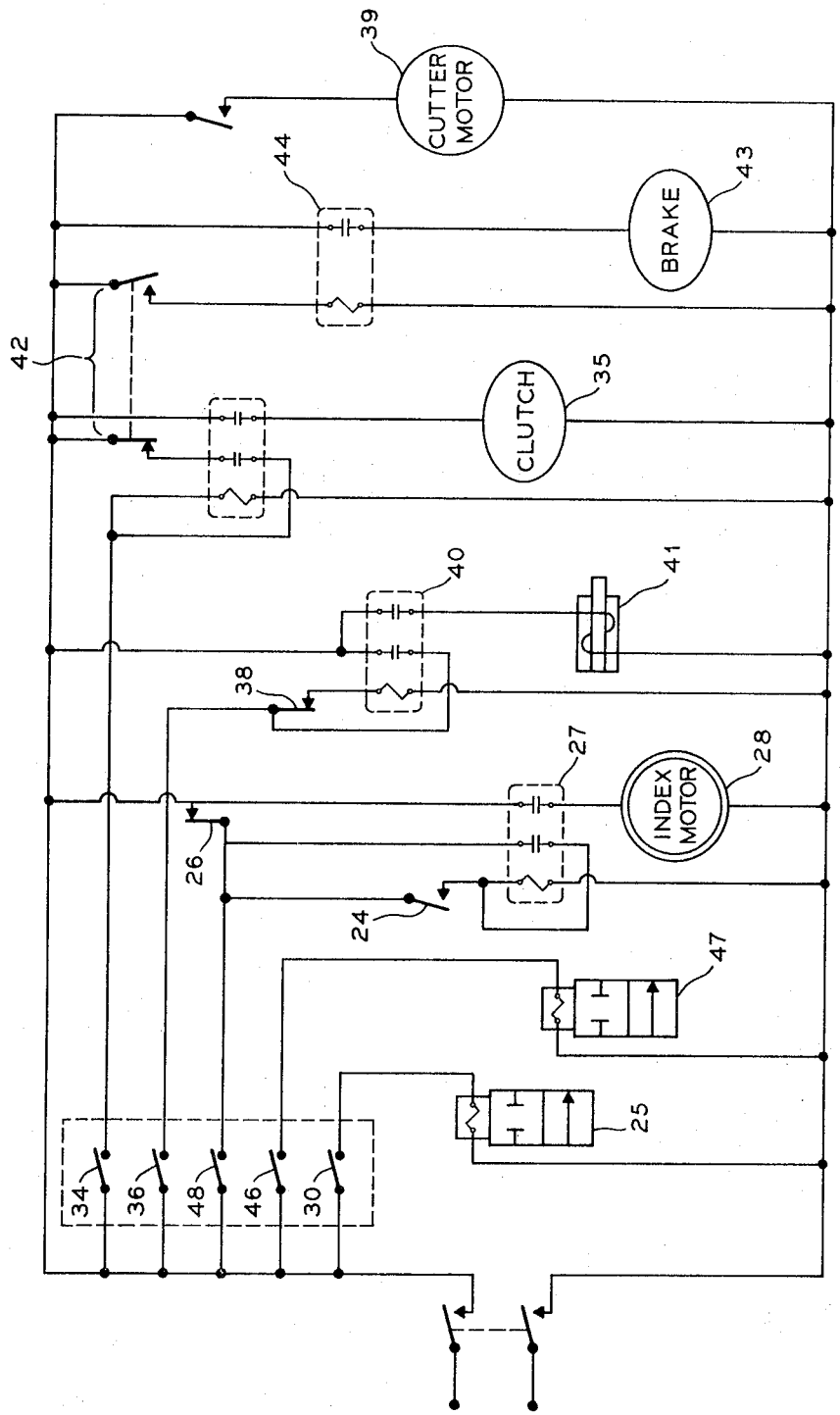

3,655,856
METHOD OF INTERMITTENTLY SEVERING CONTINUOUSLY FORMED EXTRUDATE
Paul L. Spivy, Republic, Mo., assignor to
Phillips Petroleum Company
Filed Mar. 12, 1970, Ser. No. 18,959
Int. Cl. B26d 3/16; B29c 17/14
U.S. Cl. 264—150                                            7 Claims

ABSTRACT OF THE DISCLOSURE

A continuous extrudate is bent through an arc prior to entry into a cutter unit. As the tubing in the cutter unit is held in a fixed position, the continuing extrusion of the extrudate results in increasing the size of the arc. Two limit switches are provided, one positioned so that as the size of the arc is increased to a preset amount, the tubing will touch same and thereby cause the cutting mechanism to advance the tubing, thus decreasing the size of the arc until it contacts the second limit switch which stops the movement of the material into the cutter. Thereafter, the portion of the extrudate advanced into the cutter is held in a stationary position and cut while the extrusion continues.

BACKGROUND OF THE INVENTION

This invention relates to cutting individual workpieces from a continuously extruding length.

Frequently, manufacturing operations require individual workpieces cut from an elongated extrudate or the like. Ordinarily, it is a comparatively simple matter to do this simply by severing the extrudate into individual workpieces as it is extruded. Recently, a technique has been developed for forming extremely clear blow molded containers and the like by means of reheating an individual tubular workpiece to molecular orientation temperature, stretching and expanding same out into conformity with the mold zone. In this process, quality of the original extrudate is of great significance because even minor defects in the surface characteristics of the extrudate will result in impairment of the optical properties of the resulting article. While the solidified extrudate can be severed by means of a cutting mechanism which moves along with the extrudate, even the small vibrations set up by the indexing and cutting operations are transmitted back to the orifice of the die. Of course, even worse imperfections result if the extrusion is stopped to allow for the time for the cutting operation.

SUMMARY OF THE INVENTION

It is an object of this invention to provide a method for cutting a continuous extrudate into individual workpieces without impairing the quality of the extrudate.

It is a further object of this invention to automatically sever a continuous extrudate regardless of the extrusion rate; and It is yet a further object of this invention to sever a length of tubing or the like which is being continuously extruded.

In accordance with this invention, an extrudate is continuously formed and bent through an arc of at least 90° with the end thereof being held by a cutting mechanism which mechanism is activated by two limit switches, one of which causes the cutting mechanism to advance the tubing when the extrusion has caused the arc to reach a preset point and the other of which causes the cutting mechanism to hold the tubing stationary when said cutting mechanism has been advanced to where the arc is small enough to contact same.

BRIEF DESCRIPTION OF THE DRAWINGS

In the drawings, forming a part hereof, wherein like reference characters denote like parts in the various views, FIG. 2 is a more detailed view of the cutting assembly of FIG. 1, and FIG. 3 is a schematic electrical control diagram.

DESCRIPTION OF THE PREFERRED EMBODIMENTS

Figure 1:
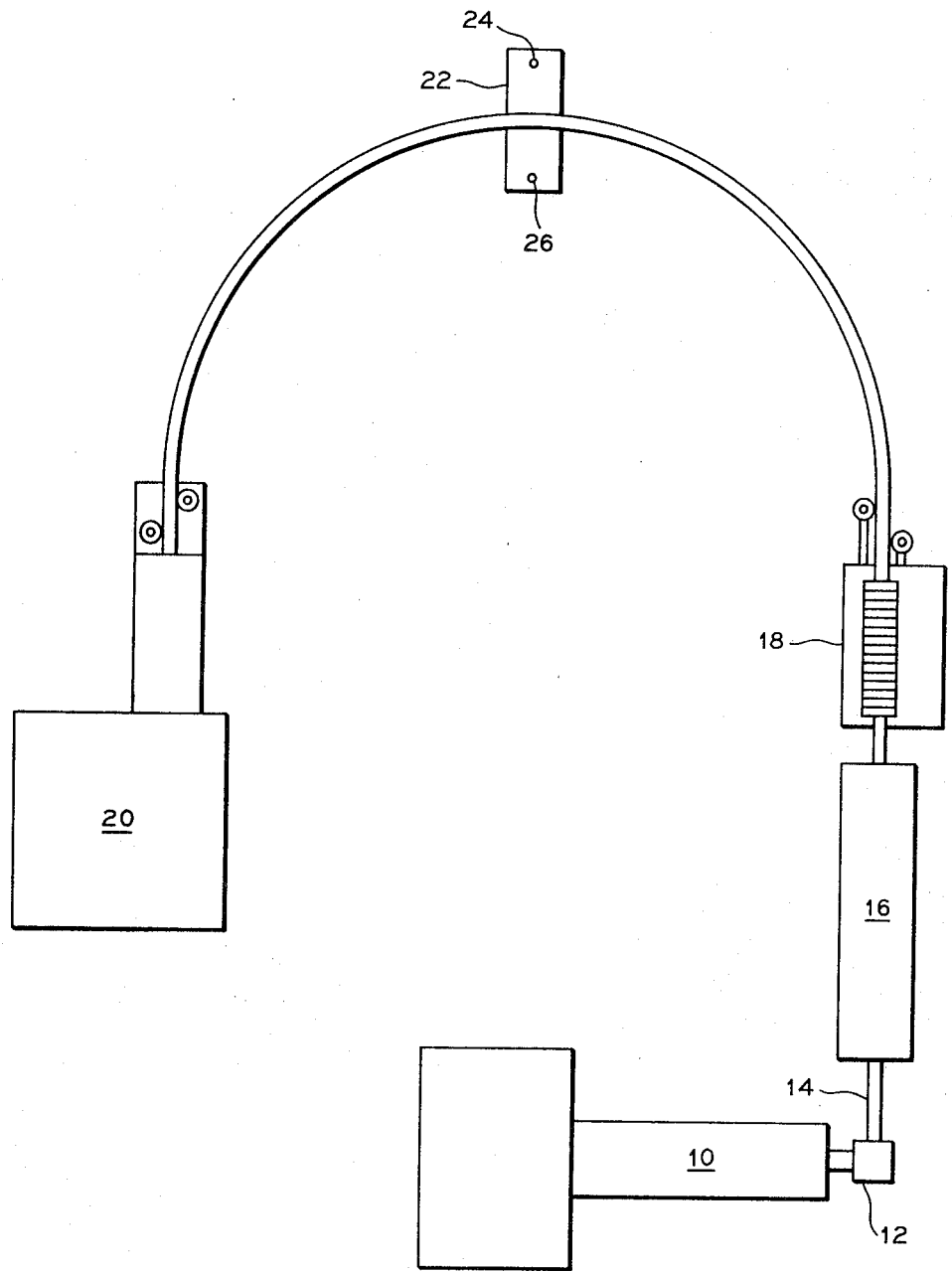
FIG. 1 is a schematic plan view of an extrusion and cutting operation in accordance with the invention.

This invention is broadly applicable to the severing of any continuous extrudate into individual workpieces, for instance, such extrudates as plastic tubing, rods, channels, and other profiles of plastic and the like can be severed thereby. However, the invention is of particular utility in the severing of tubular parisons of polymers of at least one mono-1-olefin having 2–8 carbon atoms per molecule, which parisons are thereafter reheated to orientation temperature and blow molded to give clear, strong containers and the like.

Any type of cutting mechanism can be used, but a cutter utilizing a rotary motion as shown in the drawings is preferred because it makes a smooth cut with no sharp lips, breaks, or residue being left on the tube.

The arc can vary from 90–360° with an arc as shown of about 180° being particularly satisfactory.

The switches which establish the limits of travel of the arc of extrudate can be mechanical microswitches, photoelectric sensing devices, or any other conventional sensing means.

Referring now to the figures, particularly FIG. 1, there is shown an extruder 10 which forces molten polymer through die 12 to form extrudate 14 which is passed through vacuum cooling and sizing tank 16 to solidify same. The thus cooled tubing is axially advanced by means of tube puller 18. The tubing is bent into an arc as shown with the end of the tubing being held within cutting and indexing means 20. The radius must be rather large, and, depending on the flexural modulus of the specific material, will generally be 5–20, preferably 10–12 feet. The flexural modulus must be high enough for the extrudate to assume a definite shape and yet low enough that it will not break. Polymers having a flexural modulus of 10,000–500,000, preferably 50,000 to 300,000 (ASTM D–790–63) can be satisfactorily formed in accordance with the invention. As shown, the apparatus is disposed in a horizontal plane with the tubing supported at the midpoint of the arc by frame 22. As shown, the tubing is in the form of a perfect half circle and is disposed midway between limit switches 24 and 26. With the tubing held in a stationary position in cutter and indexing means 20 and the extruder 10 operating continuously, it is apparent that this arc of tubing will expand toward limit switch 24. The closing of limit switch 24 energizes relay 27 (see FIG. 3 for the relationship of the various electrical components). The contacts of relay 27 are closed to start the indexing drive motor 28 (see FIG. 2) and to lock in the relay circuit. Clamps 29 of the indexing drive unit 31 clamp onto the tubing and move forward (left) thus indexing a length of tubing into the cutting and clamping module. The indexing means must move forward at a rate greater than the extrusion rate. After the index is complete, a first cam actuated switch 30 is closed to actuate a solenoid 25 which controls the flow of air to air cylinder 32 on tubing clamps 33 which hold the tubing adjacent the cutting means. The next switch to be actuated is cam actuated switch 34 which engages a clutch drive 35 in the chain of the cutting units. Also, cam actuated switch 36 is actuated about this time to activate power solenoid 41 which retracts the cutting apparatus trip lever. The rotating cutting unit 37 trips limit switch 38 after the unit powered by cutter motor 39 has made one revolution. This deactivates relay 40. The opening of the relay contacts allows a trip lever to fall into place so that the cutting blade (not shown, the cutting blade slides in the slot shown in rotating unit 37 and is advanced by cam surface 45 as the entire unit rotates) will retract from the cut tubing when the cutting unit finishes its second revolution. As the cutting unit finishes its cut, another limit switch 42 disengages clutch 35 and engages brake 43 simultaneously to stop the cutting unit. Relay 44 is a time delay relay so that the brake will be energized only long enough to stop the drive shaft.

While the cut is being made, the indexing unit also finishes its cycle. Immediately after the tubing clamps 33 on the cutting module have been engaged, cam switch 46 can be opened to release the indexing clamp 29 from the extrudate 14 by actuating solenoid which controls the flow of air in cylinder 49. This allows the indexing motor to return the index clamping unit to the right to pick up another length of uncut tubing. The indexing motor continues to run and the cycle repeats itself until the length of uncut tubing in the arc becomes so short that the limit switch 26 is tripped. Cam operated switch 48 is set so that it is open only when cam operated switch 46 is closed. This means that the indexing drive motor can stop only during that part of the cycle when the indexing clamp is gripping the tubing. The indexing unit remains stationary until enough tubing has been extruded to increase the arc length enough to trip limit switch 24 again to restart the indexing drive.

Limit switch 26 can be so positioned that when the indexing unit starts forward, it goes forward until switch 26 is tripped. A more accurate indexing can be obtained by utilizing a limit switch which is contracted by the forward movement of indexing drive unit 31. Thus if, for instance, three cutting units 37 are used and each parison is to be 5 inches long the switch is set so that the tubing is advanced exactly 15 inches. Preferably, indexing drive unit 31 is disposed relative to the cutting unit a distance such that a subsequent cut will be made in the area clamped by clamp 29 so that the sides of the parison will not be scarred.

In order to simplify the drawings, cutting and indexing means 20 has been shown with a single cutting unit. Preferably, however, three or more cutting units would be arranged in tandem so as to form three or more individual work pieces during each cutting operation.

Many conventional parts such as frame members, heating elements, temperature controllers, and the like have been omitted for the sake of simplicity, but their inclusion is understood by those skilled in the art and is within the scope of the invention.

EXAMPLE

Propylene homopolymer having a density of 0.905 (ASTM D 1505–63T), a melt flow of 2 (ASTM D 1238–62T, Condition L), and a crystalline melting point of about 340° F. was continuously melt extruded into tubing having an outside diameter of 0.8-inch and a wall thickness of 0.150-inch. The tubing was cooled to room temperature in a vacuum sizing and quenching chamber from which it was pulled by means of traveling rubber tracks as shown in FIG. 1. The tubing was bent through an arc of 180° with a radius of 11 feet. The end of the tubing was fed into an indexing and cutting mechanism as shown in the figures except that three cutting units are utilized. The tubing is extruded at a rate of 10 feet per minute. When the arc increases to a point where a first limit switch corresponding to switch 24 in FIG. 1 is contacted, the end of the tube is advanced 15 inches into the cutter, at which point it contacts second limit switch such as is shown by reference character 26 in FIG. 1. Thereafter a mechanism such as is shown in the figures is activated to cause rotating blades to impinge on the tubing to sever same into three individual five-inch parisons. Visual examination of the parisons show that there are no surface imperfections due to transmission of vibrations during cutting back to the extrusion die. These parisons are heated to a temperature of 1–50° F. below the crystalline melting point, stretched longitudinally, and expanded by internal fluid pressure into conformity with a mold zone to give biaxially oriented clear bottles having excellent optical characteristics.

Similar parisons were made by extruding tubing through an identical extruder, cooling tank, and pulling mechanism, but thereafter allowing the cooled tubing to exit from the pulling mechanism in a straight line direction, at which point it was severed by means of a travelling cutter. Vibrations from this operation were transferred back to the extrusion die thus giving surface imperfections in the resulting parisons which surface imperfections were noticeably visible when the parisons were blown int biaxially oriented bottles by heating to a temperature of 1–50° F. below the crystalline melting point, stretching same, and expanding by internal fluid pressure.

While this invention has been described in detail for the purpose of illustration, it is not to be construed as limited thereby, but is intended to cover all changes and modifications within the spirit and scope thereof.

I claim:

1. A method of forming individual elongated workpieces comprising:
    continuously and uninterruptedly forming an elongated extrudate from an extrusion die;
    bending said extrudate through an arc of from 90 to 360°;
    holding a forward end of said extrudate stationary by gripping said extrudate at an area spaced back a short distance from said forward end so that said continuous extrusion causes the size of said arc to increase to a degree sufficient to cause said extrudate in said arc to actuate a first switch;
    advancing said forward end of said thus gripped extrudate into a cutting zone at a rate greater than the rate of extrusion;
    reducing the size of said arc by said advance a sufficient amount to cause said extrudate in said arc to actuate a second switch to stop said advance of said extrudate;
    holding said forward end of said advance extrudate stationary within said cutting zone and servering said thus held extrudate at a point between said forward and said area where said extrudate is gripped to form at least one individual elongated workpiece while preventing transmission of vibrations during said cutting back to said extrusion die.

2. A method according to claim 1 wherein said extrudate is a tubing.

3. A method according to claim 1 wherein said arc is about 180°.

4. A method according to claim 1 wherein said extrudate comprises a polymer of at least one mono-1-olefin having 2–8 carbon atoms per molecule.

5. A method according to claim 4 wherein said extrudate is passed through a cooling zone and wherein said thus cooled extrudate is pulled from said cooling zone.

6. A method according to claim 4 wherein said extrudate in said cutting zone is severed by rotating a cutting blade around said extrudate.

7. A method according to claim 4 wherein a radius of said arc is between 5 and 20 feet.

References Cited

UNITED STATES PATENTS

| | | | |
|---|---|---|---|
| 3,538,210 | 11/1970 | Gatto | 264—209 X |
| 3,520,963 | 7/1970 | Allseits et al. | 264—209 X |
| 3,238,826 | 3/1966 | Crispe | 83—236 X |
| 1,787,657 | 1/1931 | Andren et al. | 83—236 X |
| 2,607,074 | 8/1952 | Slaughter | 18—14 A |

ROBERT F. WHITE, Primary Examiner

J. H. SILBAUGH, Assistant Examiner

U.S. Cl. X.R.

18—14 A; 83—42, 211, 236; 264—151, 209

UNITED STATES PATENT OFFICE

CERTIFICATE OF CORRECTION

Patent No. 3,655,856          Paul L. Spivy          Dated: April 11, 1972

It is certified that error appears in the above-identified patent and that said Letters Patent are hereby corrected as shown below:

Column 4, line 62, Patent Claim 1, after "forward" and before "and" should be --- end ---.

Signed and sealed this 22nd day of August 1972.

(SEAL)
Attest:

EDWARD M. FLETCHER, JR.                ROBERT GOTTSCHALK
Attesting Officer                      Commissioner of Patents